A. O. TATE.
SEPARATOR FOR STORAGE BATTERIES.
APPLICATION FILED MAR. 8, 1919.

1,323,796.

Patented Dec. 2, 1919.

Inventor,
Alfred O. Tate
By Sheffield & Betts
Attorneys

UNITED STATES PATENT OFFICE.

ALFRED O. TATE, OF NEW YORK, N. Y.

SEPARATOR FOR STORAGE BATTERIES.

1,323,796.     Specification of Letters Patent.     Patented Dec. 2, 1919.

Application filed March 8, 1919. Serial No. 281,382.

*To all whom it may concern:*

Be it known that I, ALFRED O. TATE, a subject of the King of Great Britain, and a resident of borough of Manhattan, city, county, and State of New York, have invented certain new and useful Improvements in Separators for Storage Batteries, of which the following is a specification.

My invention relates to separators such as are commonly employed in storage batteries between the plates or grids for the purpose of preventing the batteries becoming short circuited. Heretofore separators made of wood have been most largely employed, but these filter the electrolyte and retard the action and restrict the energy output of the cells, particularly on high discharge rates. The difficulty has been to find a substance otherwise suitable for this use that would withstand the action of sulfuric acid, that is to say, to find a substance that could be so shaped or formed as not to retard the action or restrict the energy output, and which would have the necessary mechanical strength, and at the same time would not be eaten up or destroyed by the acid.

I have found by a long series of experiments that cocoa-nut fiber, which forms the outer shell of the cocoa-nut proper, (such as is commonly used for cocoa-nut matting) will withstand the action of sulfuric acid. According to my invention I take a cocoa-nut yarn and weave it—warp and weft to any desired width and length—in the same general way that "homespun" fabric is woven, and after cutting this into appropriate sizes, and if necessary binding the edges, use the individual pieces as separators.

Of course I may take the required width for a standard battery and weave an indefinite length of fabric, thereafter cutting off the required lengths and binding the top and bottom edges.

Figure 1:
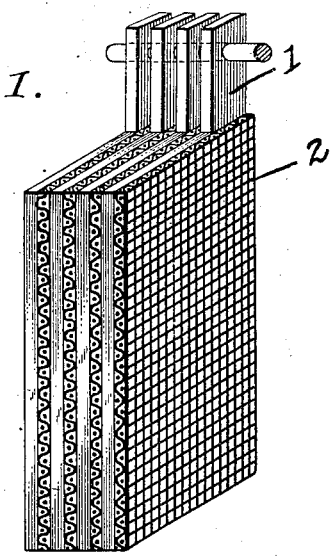
Figure 2:
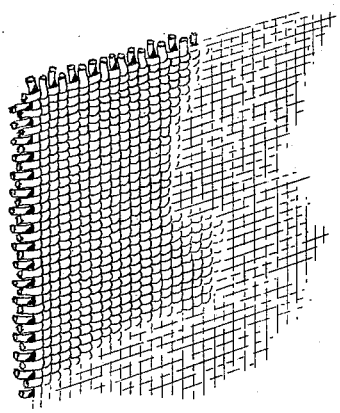

My invention is illustrated in the accompanying drawing in which Figure 1 shows an assembling of battery plates separated by my improved separators. Fig. 2 is a detail view showing the fabric forming the separators.

Referring in detail to the drawing, the battery plates 1 are disposed as usual and are separated from each other by the separators 2 formed of a woven fabric, preferably fabric woven of cocoa-nut fibers. This fabric may be woven in the usual way and is preferably woven rather loose or open so that the electrolyte may pass freely through the same, so that there will be no filtration and no reduction of the energy output of the cell, even on high discharge.

Having now described my invention, what I claim is:

A separator for storage batteries formed of a woven fabric of cocoa-nut fiber, substantially as described.

ALFRED O. TATE.